Dec. 9, 1930. R. V. HEUSER 1,784,442
METHOD OF MAKING SUBSTITUTED GUANIDINES
Filed March 5, 1925
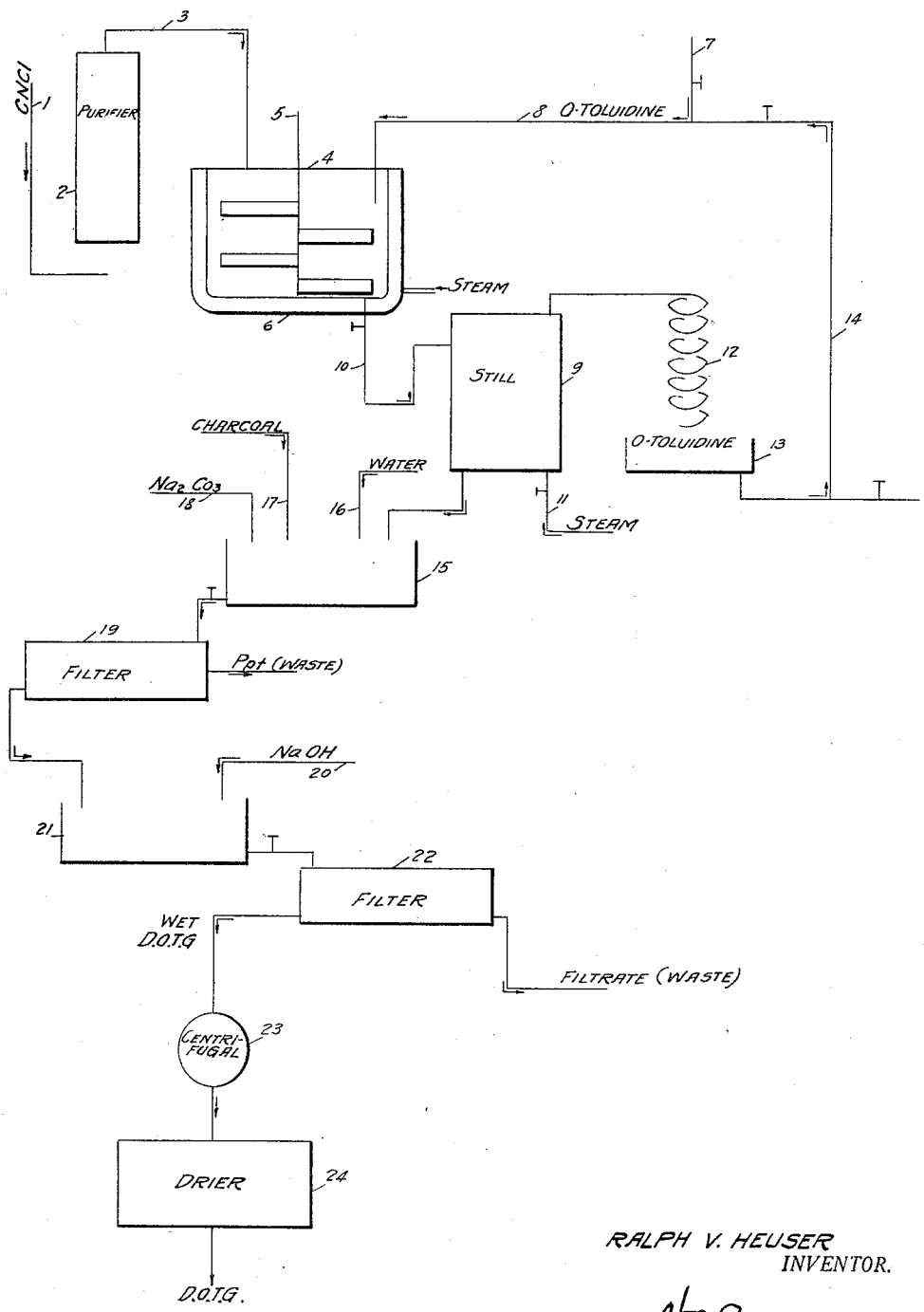
RALPH V. HEUSER
INVENTOR.
BY H.C.Bierman
ATTORNEY.

Patented Dec. 9, 1930

1,784,442

UNITED STATES PATENT OFFICE

RALPH V. HEUSER, OF ELIZABETH, NEW JERSEY, ASSIGNOR TO AMERICAN CYANAMID COMPANY, OF NEW YORK, N. Y., A CORPORATION OF MAINE

METHOD OF MAKING SUBSTITUTED GUANIDINES

Application filed March 5, 1925. Serial No. 13,208.

This invention relates to substituted guanidines, more particularly to a method of making the same and to products thereof which are suitable for accelerating the vulcanization of rubber.

This application is a continuation in part of my co-pending application Serial No. 1393, filed Jan. 9th, 1925, for method of making diphenylguanidine in which I have described and claimed a method which includes producing cyanogen chloride free from substantial amounts of chlorine and hydrochloric acid, and passing the same over aniline, whereby it is absorbed forming diphenylguanidine hydrochloride. To hasten and complete the reaction the aniline is heated. The product is then purified and the free base is precipitated, washed and dried.

In continuing my experiments, I discovered that the type of reaction utilized by me in the production of diphenylguanidine may be used for the production of other substituted guanidines. My experiments have included researches on various homologues of benzol and I have found that, by this general method I may make not only straight aryl guanidines but also mixed aryl guanidines as well as guanidines having both aryl and alkyl groups linked with nitrogen.

For instance, I have prepared di-o-tolylguanidine by passing substantially pure cyanogen chloride into a steam jacketed reaction kettle over the surface of heated o-toluidine, which absorbs the gas forming di-o-tolylguanidine hydrochloride and impurities. The residual gas is scrubbed by fresh o-toluidine to remove therefrom any unreacted cyanogen chloride. The mixture is subjected to steam distillation to remove unreacted o-toluidine and the reaction product is treated first with a solution of soda ash and then with caustic soda solution to first eliminate the basic impurities and then to precipitate the pure di-o-tolylguanidine.

In the accompanying drawing constituting a part hereof, the single figure is a diagrammatic view of a system adapted for the practice of this invention.

Cyanogen chloride, containing an excess of chlorine, is passed through pipe 1 into the purifying tower 2 where the chlorine is removed by causing it to combine with copper or iron or both. The purified gas then flows through pipe 3 into the reaction vessel 4 fitted with a stirring device 5 and a steam jacket 6, and containing o-toluidine which enters through pipes 7 and 8 from any suitable source and over the surface of which the cyanogen chloride passes. The stirrer 5 is slowly revolved and steam is passed into the jacket 6 to maintain a temperature in the vessel 4 of about 100° C. to complete the reaction and to keep the mass fluid. The reacted mass is then transferred to still 9 through pipe 10 and steam is injected through pipe 11, vaporizing the o-toluidine, which is liquefied in condenser 12 and drops into the container 13. The o-toluidine may be separated from the water and with or without further purification, be added to the o-toluidine in the vessel 4 by means of pipes 14 and 8.

The di-o-tolylguanidine hydrochloride with basic impurities is transferred to tank 15 where it is thoroughly mixed with a large quantity of water 16 and a small amount of finely divided charcoal 17, such as "Darco," and a sufficient quantity of a weak 2.5% sodium carbonate solution 18 is added to render the solution slightly alkaline. The amount of di-o-tolylguanidine hydrochloride in the solution should be small, say not over 4%. The material is then filtered in 19 to remove the precipitated weak bases, leaving practically nothing but di-o-tolylguanidine hydrochloride, sodium chloride and some sodium carbonate in solution.

The filtered liquid is added slowly at first and then more rapidly to sufficiently dilute (approximately 6%) caustic soda solution 20 in tank 21 to precipitate all of the di-o-tolylguanidine base, which is practically insoluble at ordinary temperatures in very dilute caustic soda solutions containing sodium chloride, and also in water, which is used for washing the same. The material is filtered and washed in filter 22 and is then centrifuged and dried in the centrifugal 23 and drier 24, respectively.

This method of manufacture is, in general, applicable to the production of many similar compounds, some of which are briefly described below:

Di-m- or p-tolylguanidine may be made from m- or p-toluidine and cyanogen chloride.

Di-o, m- or p-amino-phenylguanidine may be made from o-, m-, or p-phenylenediamine and cyanogen chloride.

Di-m- or p-amino-tolylguanidines may be made from the proper toluenediamine and cyanogen chloride.

Phenyl-o- or p-tolylguanidine are representative of mixed substituted guanidines which may be made in accordance with my invention. I may first prepare and isolate phenyl cyanamid by the interaction of cyanogen chloride and aniline, the reaction being arrested at an intermediate stage, as described and claimed in the co-pending application of John L. Osborne and George Barsky, which has matured into Patent No. 1,611,941, issued December 28, 1926, for method of preparing substituted cyanamids, and assigned to the American Cyanamid Company. The method consists in providing a solution of an aromatic amine, such as aniline, in water, passing gaseous cyanogen chloride into the solution to react with the aniline, or the like, to produce phenyl cyanamid, and keeping the reaction mixture cool by means of cooling water. The hydrochloric acid formed in the reaction is neutralized as it is formed by calcium carbonate. The phenyl cyanamid, which may first be subjected to a purification treatment, is allowed to react with o- or p-toluidine to form the corresponding mixed, di-substituted guanidine.

Alkyl phenylguanidines, such as methyl phenylguanidine may be prepared by the interaction of phenyl cyanamid with methylamine gas or the hydrochloride. Alkyl tolylguanidines may be made in a similar manner starting with tolyl cyanamid which is formed by the interaction of cyanogen chloride and toluidine.

Di-alkyl-phenyl- and tolylguanidines may be prepared by reacting on phenyl- or tolyl cyanamid with the corresponding di-alkyl amine hydrochloride, such as di-methyl- or di-ethylamine hydrochloride.

Di-methyl di-phenyl guanidine may be prepared by the interaction between one molecule of cyanogen chloride and two molecules of mono-methyl aniline. The tolyl derivatives may be similarly prepared.

I anticipate that all of the above named compounds have properties which render desirable the use thereof for the acceleration of the vulcanization of rubber. In particular those compounds having an alkyl group directly linked with nitrogen are very active.

For instance, methyl phenylguanidine, having the structural formula:

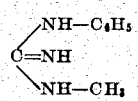

is valuable as an accelerator, the methyl group giving activity to the compound, and the phenyl group rendering it water-insoluble, both properties being highly desirable in an accelerator.

Alkyl-aryl di-substituted guanidines such as methyl phenylguanidine, described above, may be prepared by first providing a mixture of an alkyl amine and an aryl amine and causing cyanogen chloride to contact with the same in a manner similar to the procedure given above in detail for the production of di-o-tolylguanidine. In making methyl phenylguanidine by this method I start with a mixture of a methyl amine and aniline.

From the above it will be seen that I may utilize two methods for the preparation of substituted guanidines, the first of which may be considered a one step method and the other a two step method. The one step method is readily applicable although not limited to the manufacture of symmetrical di-substituted guanidines by the direct reaction between cyanogen chloride and a suitable amine. The two step method is especially applicable to the manufacture of non-symmetrical di-substituted guanidines although it may be used to produce the symmetrical compounds as well. This latter method consists in first providing a suitable substituted cyanamid, such as phenyl or tolyl cyanamid by any well known process and then causing the same to react with a suitable amine, such as methyl amine or aniline.

Although I have described my invention setting forth a number of embodiments thereof, my invention is not limited thereto, as many other substances of similar character may be prepared in accordance with my method. The method is simple, does not require complicated apparatus for the practice thereof, close control thereof is not necessary, and the efficiencies are high, making it extremely economical. These and other advantages are inherent in my invention, the scope of which is defined in the claims appended hereto.

I claim:

1. A method of making substituted guanidines which comprises bringing cyanogen chloride, free from substantial amounts of chlorine and hydrocyanic acid, into contact with a secondary aryl-alkyl amine and causing a reaction to take place therebetween in one operation.

2. A method of making substituted guanidines which comprises bringing cyanogen chloride, free from substantial amounts of chlorine and hydrocyanic acid, into contact with aniline having an amino hydrogen replaced by an alkyl group and causing a reaction to take place therebetween in one operation.

3. A method of making substituted guanidines which comprises bringing cyanogen chloride, free from substantial amounts of chlorine and hydrocyanic acid, into contact with an aryl and an alkyl compound each containing an NH₂ group and causing a reaction to take place therebetween.

4. A method of making substituted guanidines which comprises bringing cyanogen chloride, free from substantial amounts of chlorine and hydrocyanic acid, into contact with an alkyl compound containing an NH₂ group and causing a reaction to take place therebetween to form di-substituted guanidines in one operation.

5. A method of making substituted guanidines which comprises bringing cyanogen chloride, free from substantial amounts of chlorine and hydrocyanic acid, into contact with a hydrocarbon compound containing a plurality of NH₂ groups, and causing a reaction to take place therebetween.

6. A method of making substituted guanidines which comprises bringing cyanogen chloride, free from substantial amounts of chlorine and hydrocyanic acid into contact with an aryl amino compound containing a replaceable hydrogen in the amino group and a methyl amine containing a replaceable hydrogen in the amino group, and causing a reaction to take place therebetween.

7. A method of making substituted guanidines which comprises bringing cyanogen chloride, free from substantial amounts of chlorine and hydrocyanic acid into contact with an aryl amino compound containing a replaceable hydrogen in the amino group and mono-methyl amine, and causing a reaction to take place therebetween.

8. A method of making substituted guanidines which comprises bringing cyanogen chloride, free from substantial amounts of chlorine and hydrocyanic acid, into contact with aniline and a methyl amine containing a replaceable hydrogen in the amino group, and causing a reaction to take place therebetween.

9. A method of making substituted guanidines which comprises bringing cyanogen chloride, free from substantial amounts of chlorine and hydrocyanic acid, into contact with aniline and an alkyl amine containing a replaceable hydrogen in the amino group, and causing a reaction to take place therebetween.

10. A method of preparing substituted guanidines which comprises bringing cyanogen chloride into contact with an aryl amine to form a substituted cyanamid and causing said cyanamid to react with an alkyl amine containing a replaceable hydrogen in the amino group.

11. A method of preparing methyl phenylguanidine which comprises bringing cyanogen chloride into contact with aniline to form phenyl cyanamid and causing said cyanamid to react with methyl amine.

12. Methyl-phenylguanidine having the formula:

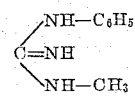

In testimony whereof, I have hereunto subscribed my name this 27th day of February 1925.

RALPH V. HEUSER.